United States Patent [19]

Murakami et al.

[11] Patent Number: 4,855,146

[45] Date of Patent: Aug. 8, 1989

[54] METHOD FOR MANUFACTURE OF CHEWING GUMS WITH SECTIONAL MOTIF PATTERNS

[75] Inventors: Sanpei Murakami; Tohru Miyaaki; Tokio Imahori; Koichi Ogata; Hidenari Hagita, all of Osaka, Japan

[73] Assignees: Kanebo, Ltd., Tokyo; Hiroshio Nishio, Kobe, both of Japan

[21] Appl. No.: 171,703

[22] Filed: Mar. 22, 1988

[51] Int. Cl.$^4$ .............................................. H23G 3/30
[52] U.S. Cl. ....................................... 426/5; 426/104; 426/249; 426/517; 425/133.1; 425/130
[58] Field of Search ................... 426/104, 5, 249, 512; 425/133.1, 130

[56] References Cited

U.S. PATENT DOCUMENTS

| | | | |
|---|---|---|---|
| 1,193,423 | 8/1916 | Pryor | 426/5 |
| 2,256,190 | 9/1941 | Bowman | 426/5 |
| 3,570,417 | 3/1971 | Herrman et al. | 426/5 |
| 3,862,338 | 1/1975 | Sapsowitz | 426/5 |
| 4,352,823 | 10/1982 | Cherukuri et al. | 426/5 |
| 4,399,154 | 8/1983 | Puglia et al. | 426/5 |

FOREIGN PATENT DOCUMENTS

| | | | |
|---|---|---|---|
| 3044535 | 6/1982 | Fed. Rep. of Germany | 425/133.1 |
| 7107550 | 2/1971 | Japan | 426/5 |

*Primary Examiner*—Jeanette Hunter
*Attorney, Agent, or Firm*—Armstrong, Nikaido, Marmelstein, Kubovcik & Murray

[57] ABSTRACT

This invention relates to a method of producing a chewing gum having a sectional motif pattern. A pattern-forming confectionery material and a chewing gum are each fed through a cylindrical passageway having an expanded intermediate portion so as to absorb the variation in the rate of feed by said expanded portion, thus enabling continuous manufacture of a chewing gum product in the shape of a bar which presents the same motif pattern in sectional area throughout its whole length.

3 Claims, 2 Drawing Sheets

METHOD FOR MANUFACTURE OF CHEWING GUMS WITH SECTIONAL MOTIF PATTERNS

TECHNICAL FIELD

The present invention relates to a method for manufacture of a chewing gum having a sectional motif pattern which is not varying irrespective of sectioning position.

BACKGROUND ART

The demand for chewing gums and particularly for a chewing gum in the slab or plate form is dwindling in the face of an increased demand for chocolate, cakes and other delicacies. Moreover, even the demand for balloon gums for children is also in the stationary phase or suffering a setback these days when a variety of confectionery products such as chocolate are available. However, in contrast to the tendency of decline in the demand for slab-like chewing gums and balloon gums, the demand for specially designed gums fashioned after the configurations of animals or well-known architectures is on the increase thanks to the interest which the specific shapes arouse in the mind of the consumer. This means that chewing gums if possessed of characters of interest or attractive features would arouse childrens' interest and motivate them to purchase them. From such points of view, it is thought that if the industry can manufacture a chewing gum having a structure similar to the well-known "kintaro-ame" (a candy such that the face of Kintaro, a famous folk story character, appears without fail irrespective of sectioning position), it will certainly attract childrens' interest and motivate them to purchase chewing gums.

For the above purpose, as shown in FIG. 4, conventionally a couple of chewing gum extrusion molding machines 1 each having a gum supply inlet 1a are installed in juxtaposition, with the discharge exit 6 of the die 5 of one extrusion molding machine 4 extending into the discharge port 3 of the die 2 of the other extrusion molding machine 1 and the open end 7 of said discharge exit 6 being formed in the shape of a spade as illustrated in FIG. 5. A motor is shown at 1b. And from one of the extrusion molding machines 1, a chewing gum is extruded into the discharge exit 3 of the die 2, while a chewing gum differing in color from the first-mentioned chewing gum is extruded from the other extrusion molding machine 4 so as to continuously manufacture a bar of chewing gum. In this conventional manufacturing process, however, as shown in FIGS. 6 (a)-(c), the chewing gum extruded in the form of a spade from the discharge exit 6 of the die 5 of one extrusion molding machine 4 is not properly accommodated, but included in a deformed condition, in the circular chewing gum extruded from the discharge exit 3 of die 2 of the other extrusion molding machine. This is probably because the rates of extrusion of chewing gums from the two extrusion molding machines 1 and 4 installed in juxtaposition vary with time. However, it is very difficult to maintain the extrusion rates of two different chewing gums at a constant level at all times. Thus, while the chewing gums fed into said one and other extrusion machines are each prepared by means of a kneader in the upstream compounding stage and sent to the extrusion molding machines 1 and 4 via transport means, the degree of kneading in said upstream compounding stage is not uniform for all kinds of gums but varies from one gum to another and, in addition, the cooling condition of gums in the course of delivery by said transport means is also another cause of variation. Both the degree of kneading and the degree of cooling affect the extrusion rates of gums and it is substantially impossible to control them properly. Therefore, the resulting product chewing gum having a sectional pattern, of necessity, has a structure such as illustrated in FIGS. 6 (a)-(c). Thus, it has heretofore been impossible to manufacture a chewing gum having a well-defined pattern in the proper sectional position.

OBJECT OF THE INVENTION

It is, therefore, an object of the present invention to provide a bar of chewing gum such that when sectioned it presents a motif pattern in the proper condition and position, irrespective of sectioning position.

DISCLOSURE OF THE INVENTION

To accomplish the above-mentioned object, the present invention provides a method of manufacturing a chewing gum having a sectional pattern which comprises using a die extrusion unit including a discharge section and, as disposed therein, a forming cylinder having an optionally configured opening with the axis of said forming cylinder being aligned in approximately parallel relation to the axis of said discharge section, feeding a pattern-forming elastic confectionery material into said forming cylinder through a cylindrical passageway having an expanded intermediate portion while feeding a chewing gum into said discharge section around the outer periphery of said forming cylinder through a cylindrical passageway having an expanded intermediate portion, and extruding continuously a bar of chewing gum presenting a constant pattern on all planes of section perpendicular to the longitudinal axis of the die extrusion unit.

EFFECTS OF THE INVENTION

The method for manufacture of a chewing gum according to the present invention is such that cylindrical passageways each having an expanded intermediate portion are provided in a suitable combination to form a desired constant pattern in the cross sections of the product, with the result that even if the rate of chewing gum or the like extruded from the nozzle of the extrusion molding machine varies, the change is absorbed in said expanded intermediate portion. As a consequence, the pattern is formed in a stable condition at all times. It is, therefore, possible to continuously manufacture a chewing gum bar which presents a constant motif pattern in the proper position on all planes of section perpendicular to the longitudinal axis of the die unit.

BEST MODE FOR CARRYING OUT THE INVENTION

The present invention is now described in detail with reference to an embodiment.

Figure 1:
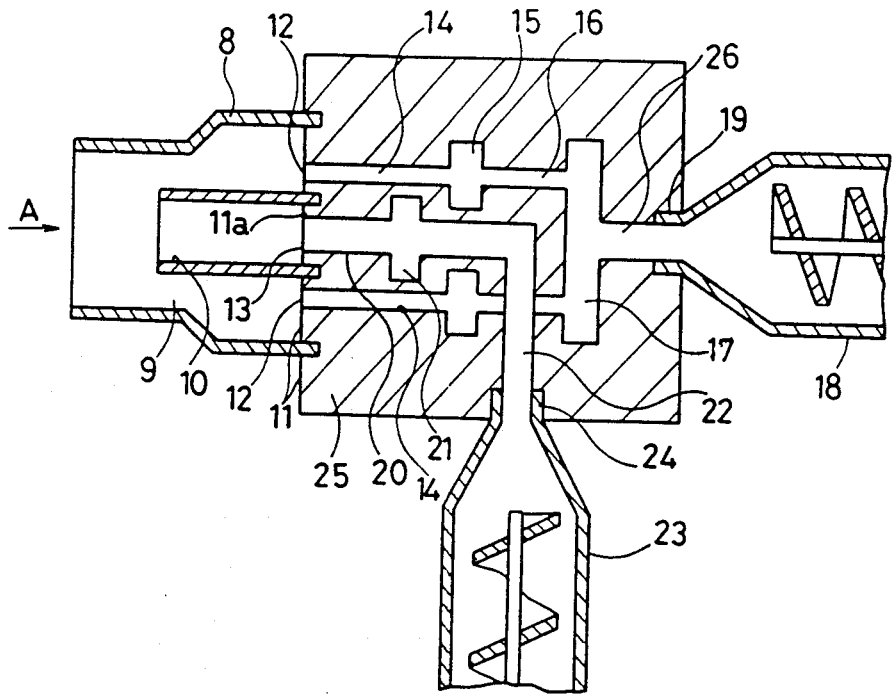
FIG. 1 is a horizontal cross-section view showing the manufacturing apparatus used in the practice of the invention.
Figure 2:
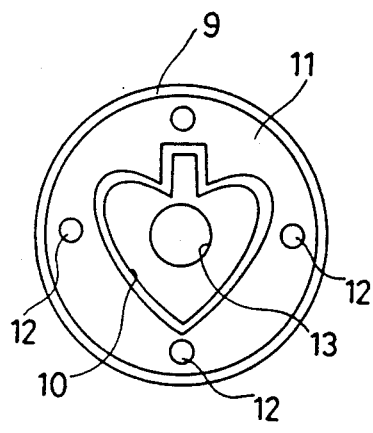
FIG. 2 is an enlarged view of FIG. 1 as viewed from the direction of arrowmark A.

FIGS. 1 and 2 show the essential components of the manufacturing apparatus for use in the practice of the invention. In these views, 8 represents a die and in its discharge section 9, a forming cylinder 10 having an opening in the shape of a spade is disposed with its axis in parallel relation to the axis of said die 8. The inner part of said discharge section 9 of die 8 is merging with a wall member 11 and as shown in FIG. 2, the wall member 11 is provided with 4 openings 12 along the circumferential direction. Moreover, the inner part of the cylindrical element 10 is also merging with a wall member 11a, which is also provided with an opening 13. Extending rearwardly from the inner opening 12 of the discharge section 9 of said die 8 is a cylindrical passageway 14 and this passageway 14 is enlarged in its intermediate position to form a second cylindrically expanded portion 15 of large diameter, with a passageway 16 extending rearwardly from said second enlarged portion 15. The above passageway 16 communicates with a first large-diameter cylindrical expanded portion 17 disposed rearwardly and a discharge nozzle 19 of a first extrusion machine 18 is fitted into a flow passageway 26 extending from said large-diameter cylindrical expanded portion 17. Further, extending reawardly from the inner opening 13 of said forming cylinder 10 is a cylindrical passageway 20 which has an intermediate large-diameter expanded portion 21, from which a small-diameter cylindrical passageway 22 is extending and bent partway at right angles into communication with a nozzle 24 of a second extrusion molding machine 23. Thus, the first and second extrusion molding machines 18, 23 are disposed with their axes oriented perpendicular to each other. And each of the respective extrusion molding machines 18, 23 is provided with an independent driving motor (not shown). Indicated at 25 is a base in which said flow passageways are formed. The base is made of iron, for instance.

Figure 3:
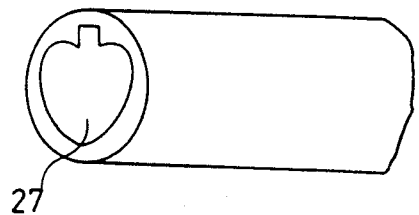
FIG. 3 is a perspective view showing the chewing gum bar according to the invention.
Figure 4:
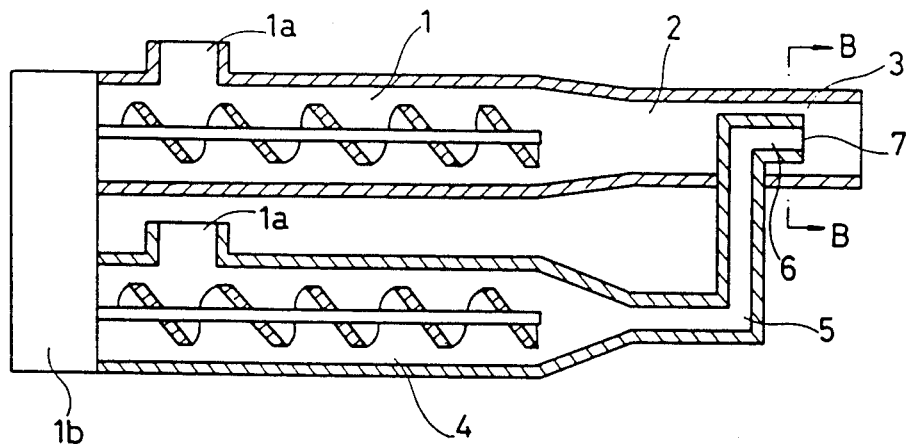
FIG. 4 is a cross-section view showing the conventional manufacturing apparatus.
Figure 5:
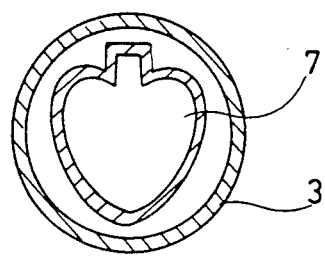
FIG. 5 is a cross-section view taken along the line B, B' of FIG. 4.
Figure 6:
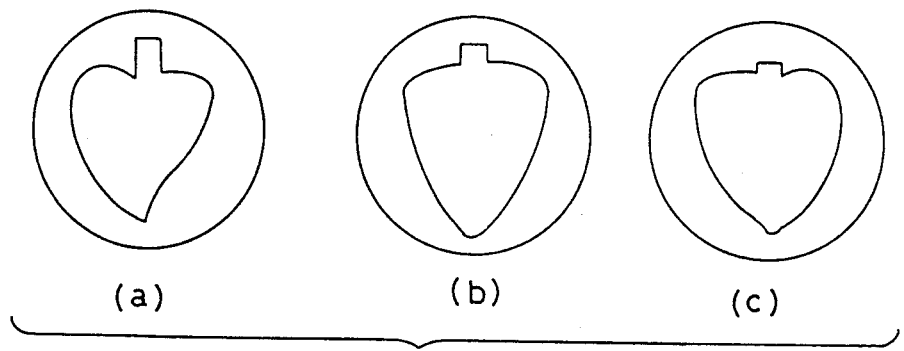
FIG. 6 is a side elevation view showing the conventional product.

In the above construction, a white gum is extruded from the nozzle 19 of the first extrusion molding machine 18 into said cylindrical passageway 26. This discharged gum is delivered to the expanded portion 17, small-diameter cylindrical passageway 16 and second expanded portion 15, and small-diameter passageway 14 in succession and is discharged from the annular openings 12 within the discharge section 9 of the die 8. From the nozzle 24 of the second extrusion molding machine 23, a chewing gum having a different color is delivered successively to the cylindrical passageway 22, intermediate expanded portion 21 and small-diameter cylindrical passageway 20, from which it is discharged into the body of the spade-shaped forming cylinder 10. In this instance, the chewing gums discharged from the nozzles 19, 24 of the first and second extrusion machines 18, 23 do not directly reach the discharge section 9 of the die 8 but travel through the cylindrical passageways 14, 20 having intermediate expanded portions 15, 17 and 21, so that the gums are pooled once in these expanded portions 15, 17 and 21. Therefore, even if the different physical properties (degrees of kneading and cooling) of chewing gums fed to said first and second extrusion molding machines 18, 23 from the upstream stage cause a variation in the supply of chewing gums from the nozzles 19, 24 of the first and second extrusion modding machines 18, 23, the variation is absorbed by said expanded portions 15, 17 and 21, with the result that a constant flow of chewing gum is extruded from the opening 12 formed in the inner part of the discharge section 9 of the die 8 and, at the same time, the flow of the chewing gum of another color discharged from the opening 13 in the inner part of the forming cylinder 10 is also made constant. Therefore, as illustrated in FIG. 3, the product chewing gum bar presents a cross-section including a spade 27 of said another color in the proper position. Thus, irrespective of the position of slicing, this chewing gum bar shows a proper spade-shaped sectional pattern.

In the above embodiment, a chewing gum of another color is a pattern-forming material to be extruded from the second extrusion molding machine 23 but the patternforming material is not limited to such chewing gum but may for example be an elastic confectionery material such as a jelly or other elastic edible material. Moreover, though the pattern of a spade is used in the above embodiment, it is possible to manufacture a chewing gum having a multi-colored complicated internal pattern by installing a plurality of forming cylinders 10 within the discharge section 9 of the die 8 and feeding the plurality of chewing gums or the like having dissimilar colors from extrusion molding machines. Furthermore, although, in the above embodiment, two extrusion molding machines are disposed with the axes of their nozzles oriented perpendicular to each other, they may be disposed in parallel with each other.

We claim:

1. A method of manufacturing a chewing gum having a sectional motif pattern with a die extruding unit comprising:

concurrently feeding a pattern-forming elastic confectionery material to a pattern-forming cylinder through a passageway having an expanded intermediate portion, and a chewing gum to a discharge section of the die through at least a second passageway having an expanded intermediate portion; said pattern-forming cylinder being disposed within said die so that said discharge section is positioned around said pattern-forming cylinder, and the longitudinal axis of said die is substantially parallel relative to the longitudinal axis of said pattern-forming cylinder;

continuously extruding said elastic confectionery material through said pattern-forming cylinder and continuously extruding said chewing gum around said elastic confectionery material and through said die to produce a chewing gum having a constant motif pattern on all planes of sections perpendicular to the longitudinal axis of said die extrusion unit.

2. A method of manufacturing a chewing gum have a sectional motif pattern with a die extruding unit comprising:

concurrently feeding a pattern-forming elastic confectionery material to a pattern-forming cylinder through a passageway having an expanded intermediate portion, and a chewing gum to a discharge section of the die through at least a second passageway having an expanded intermediate portion; said pattern-forming cylinder being disposed within said die so that said discharge section is positioned around said pattern-forming cylinder, said longitudinal axis of the die and said longitudinal axis of the pattern-forming cylinder being coaxial;

continuously extruding said elastic confectionery material through said pattern-forming cylinder, and continuously extruding said chewing gum around said elastic confectionery material and through said die to produce a chewing gum having a constant motif pattern on all planes of sections perpendicular to the longitudinal axis of said die extrusion unit.

3. A method of manufacturing a chewing gum having a sectional motif pattern as claimed in claim 2, wherein the pattern-forming elastic confectionery material is a chewing gum having a color different from that of the chewing fed to said discharge section.

* * * * *

UNITED STATES PATENT AND TRADEMARK OFFICE
CERTIFICATE OF CORRECTION

PATENT NO. : 4,855,146

DATED : August 8, 1989

INVENTOR(S) : MURAKAMI et al

It is certified that error appears in the above-identified patent and that said Letters Patent is hereby corrected as shown below:

Column 3, line 29, "reawardly" should read --rearwardly--;
line 68, "modding" should read --molding--.

Signed and Sealed this

Seventh Day of August, 1990

Attest:

HARRY F. MANBECK, JR.

*Attesting Officer*      *Commissioner of Patents and Trademarks*